J. E. FAHLSTROM.
SPARE TIRE HOLDER FOR AUTOMOBILES.
APPLICATION FILED OCT. 15, 1909.
956,954.
Patented May 3, 1910.
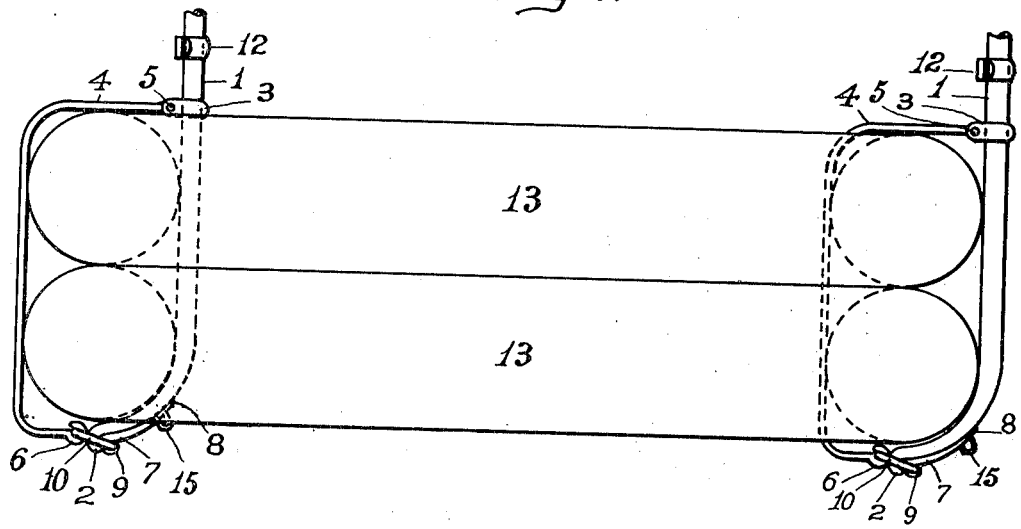
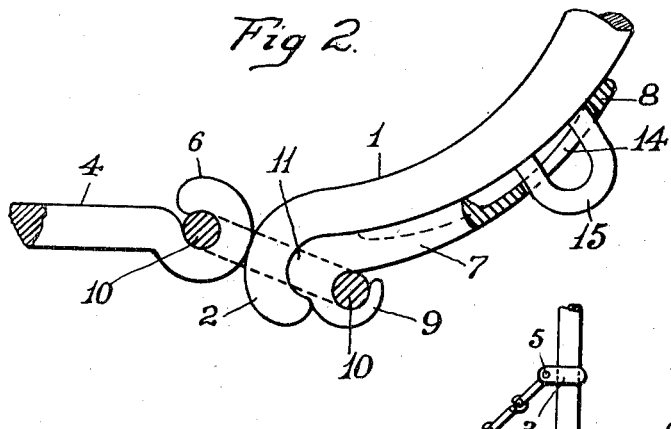
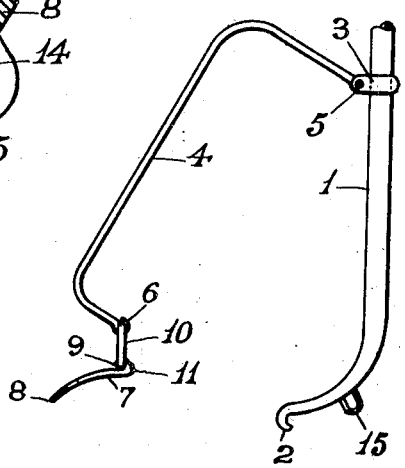
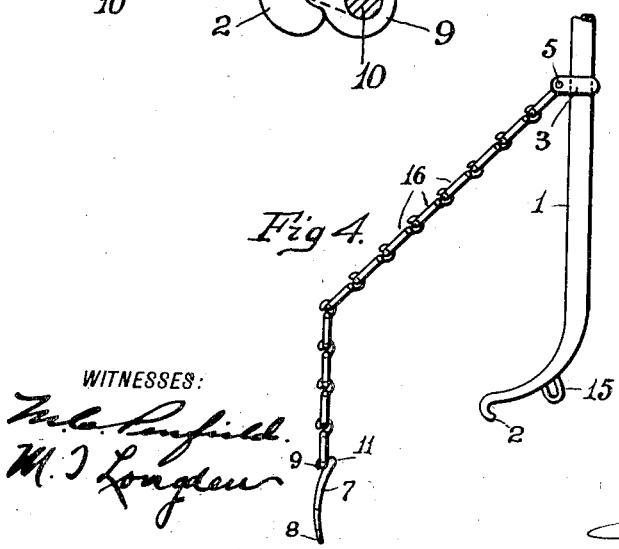
WITNESSES:
INVENTOR
J. E. Fahlstrom.
BY
ATTORNEY

UNITED STATES PATENT OFFICE.

JOHAN E. FAHLSTROM, OF BRIDGEPORT, CONNECTICUT, ASSIGNOR OF ONE-HALF TO CLIFFORD B. HICKOX, OF BRIDGEPORT, CONNECTICUT.

SPARE-TIRE HOLDER FOR AUTOMOBILES.

956,954.  Specification of Letters Patent.  Patented May 3, 1910.

Application filed October 15, 1909. Serial No. 522,736.

*To all whom it may concern:*

Be it known that I, JOHAN E. FAHLSTROM, a citizen of the United States, residing at Bridgeport, in the county of Fairfield and State of Connecticut, have invented certain new and useful Improvements in Spare-Tire Holders for Automobiles; and I do declare the following to be a full, clear, and exact description of the invention, such as will enable others skilled in the art to which it appertains to make and use the same.

My invention relates to certain improvements in spare tire holders for automobiles, and has for its object to provide a simple, effective and durable means for holding such tires to the body of an automobile, while at the same time the tires may be removed from or inserted within the holders with the greatest facility.

With these ends in view my invention consists in the details of construction and combination of parts hereinafter fully described and then particularly pointed out in the claims which conclude this description.

In the accompanying drawing Figure 1 is a plan view showing my improvement with a pair of tires contained therein, the parts being locked together so as to hold the tires securely—Fig. 2 a detail section on an enlarged scale, taken through the locked parts—Fig. 3 a plan view of one of my tire holders with the parts in unlocked condition, and Fig. 4 is a view similar to Fig. 3 but showing my improvement equipped with a chain instead of a rigid latch bar.

Similar numbers of reference denote like parts in the several figures of the drawing.

1 is a back bar whose outer end is curved and terminates in a hook 2, and 3 is a collar around said bar and capable of sliding freely.

4 is a latch bar or strap whose rear end is pivoted at 5 to the collar 3 and whose outer extremity terminates in a hook 6.

7 is a locking lever one extremity of which is formed into any suitable handle 8 while the other end terminates in a hook 9, and this lever is connected with the latch bar through the medium of a link 10 which is pivoted within the hooks 6 and 9. The rear of this lever 10 immediately opposite the hook 9 is formed into a cam 11 which coöperates with the inner surface of the hook 2 in the locking and unlocking of the parts as will be presently explained.

I employ two of these tire holders that are secured to the body of an automobile through the medium of any suitable fixtures 12 that are fastened at convenient locations to such body and are in the form of ordinary sockets through which the ends of the back bars extend. 13 are the tires contained within the holders.

The operation of my improvement is as follows:—The tires are placed in position within the holders when the latch bars are thrown open and the latter are then swung to closed position and the locking lever 7 swung around until the cam surface is engaged within the hook 2, whereupon the locking lever is swung against the outer surface of the back bar as shown, the cam 11 coöperating with the hook 2 so that the parts will be held securely in locked condition.

The handle 8 of the locking lever may be provided with an elongated slot 14 so that said handle may be engaged over any suitable staple 15 projecting from the back bar as shown at Fig. 2, in order that any ordinary padlock may be used in connection with this staple to prevent surreptitious removal of the tires.

In order to remove the tires from the holder the handle 8 is swung outwardly away from the back bar whereupon the cam 11 will act against the back bar so that the parts will be free to swing apart to unlocked position as shown at Fig. 3.

All tires are not the same size, and therefore the collars 3 are capable of sliding freely along the back bars so that allowance may be made for tires which vary in diameter, my improvement being capable of holding both the smaller and larger sizes of tires without any rattling or shaking movement.

It will of course be readily understood that the links 10 may be pivoted in any suitable manner directly to the locking levers and the outer extremities of the latch bars, and therefore I do not wish to be limited to the provision of hooks in this connection, although I greatly prefer to use such hooks since the device may be made cheaper and assembled with greater facility.

At Fig. 4 I have shown a latch strap composed of a series of links 16 the upper link being pivoted to the collar 3 while the locking lever 7 is pivoted to the end of the lowermost link. This chain is composed of links that are readily detachable so that links may be added to or taken out of the chain to lengthen or shorten the same, according to the demands of the occasion. By using a chain strap as described, one, two or three tires may be readily accommodated in my improved holder.

Having thus described my invention what I claim as new and desire to secure by Letters Patent is:—

1. A spare tire holder comprising a back bar having its outer end terminating in a hook, a collar slidable on said bar, a latch bar having one end pivoted to said collar and having its opposite end formed with a hook, a locking lever having a handle at one end and a hook at the other, the back face of said hook being extended to form a cam face which conformably engages in said hook of the back bar, and a link connected with the hook on the latch bar and the hook on the locking lever.

2. A spare tire holder comprising a back bar having its outer end terminating in a hook, a collar slidable on said bar, a latch bar having one end pivoted to said collar and having its opposite end formed with a hook, a locking lever having a handle at one end and a hook at the other, the back face of said hook being extended to form a cam face which conformably engages in said hook of the back bar, a link connected with the hook on the latch bar and the hook on the locking lever said locking lever being formed with an opening, and a staple carried by the back bar to be received in said opening of the locking lever, said staple being adapted to receive a suitable lock.

In testimony whereof, I affix my signature in presence of two witnesses.

JOHAN E. FAHLSTROM.

Witnesses:
F. W. SMITH, Jr.,
M. T. LONGDEN.